United States Patent [19]

Gardner

[11] 4,426,491

[45] Jan. 17, 1984

[54] CURABLE PHYSICAL MIXTURES AND COMPOSITES THEREFROM

[75] Inventor: Hugh C. Gardner, Somerville, N.J.

[73] Assignee: Union Carbide Corporation, Danbury, Conn.

[21] Appl. No.: 162,253

[22] Filed: Jun. 23, 1980

[51] Int. Cl.$^3$ .............................................. C08J 5/10
[52] U.S. Cl. .................... 524/878; 523/500; 524/879; 528/306; 528/345
[58] Field of Search ............ 528/306, 115, 345, 336, 528/275, ; 260/40 R; 525/425, 244, 285, 502, 531; 524/878, 879; 523/500

[56] References Cited

U.S. PATENT DOCUMENTS

| Re. 23,514 | 6/1952 | Voss et al. | 528/306 X |
|---|---|---|---|
| 2,031,481 | 2/1936 | Haskins | 528/306 X |
| 2,047,398 | 7/1936 | Voss et al. | 528/306 X |
| 2,234,958 | 3/1941 | Bradley et al. | 528/306 X |
| 3,773,856 | 11/1973 | Takiyama et al. | 525/531 X |
| 3,980,483 | 9/1976 | Nishikubo et al. | 525/531 X |
| 4,146,452 | 3/1979 | Weber et al. | 525/531 X |
| 4,229,559 | 10/1980 | Cotter et al. | 526/271 |
| 4,262,100 | 4/1981 | Dunleavy et al. | 525/445 |
| 4,263,413 | 4/1981 | Gardner et al. | 525/34 |

*Primary Examiner*—Earl A. Nielsen
*Attorney, Agent, or Firm*—Donald M. Papuga

[57] ABSTRACT

Described herein is a curable physical mixture comprising (a) an active hydrogen containing compound selected from a polyol, a polyamine, an amino alcohol, or mixtures thereof, (b) an unsaturated carboxylic anhydride, and (c) an ethylenically unsaturated monomer. These mixtures are cured to give a thermoset crosslinked composition.

2 Claims, 1 Drawing Figure

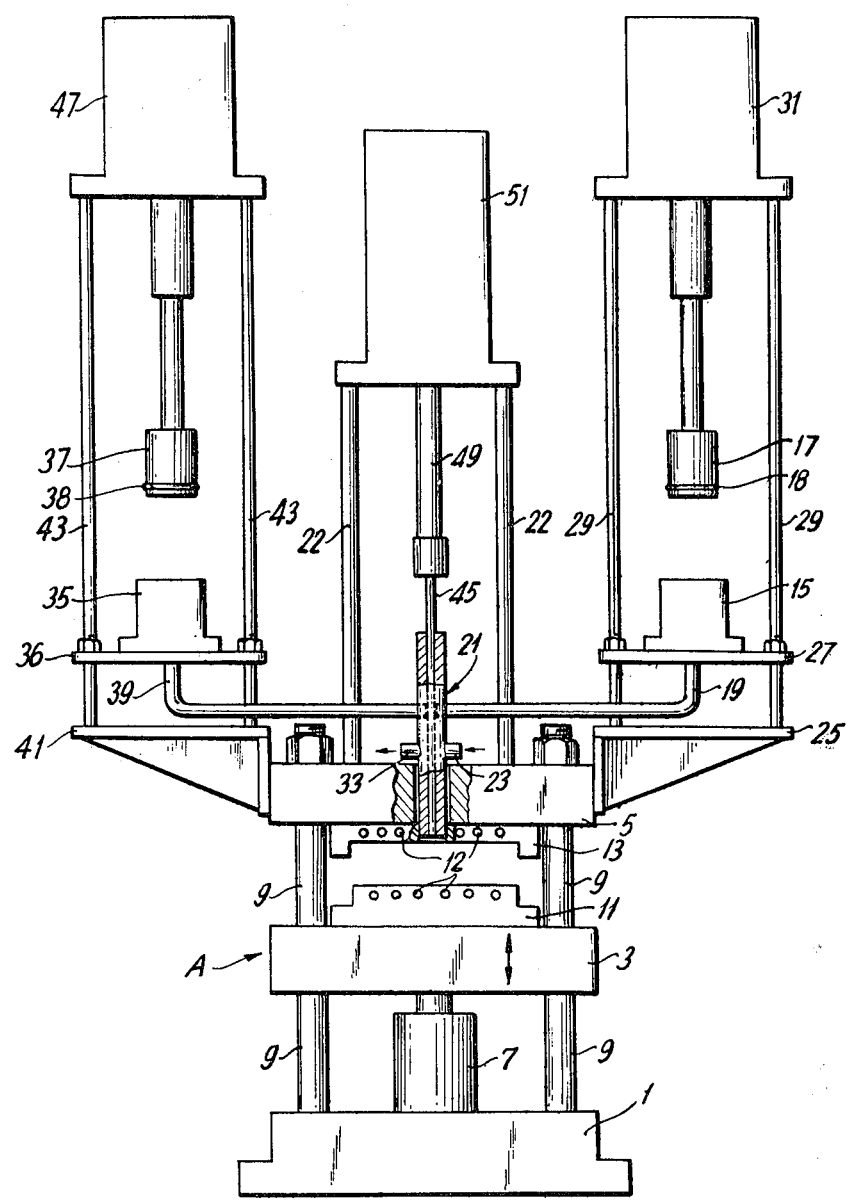

CURABLE PHYSICAL MIXTURES AND COMPOSITES THEREFROM

This invention is directed to thermosetting resins compositions which can be employed in the manufacture of composite structures, and particularly in the manufacture of fiber-reinforced plastic compositions (FRP). The thermosetting resin composition of this invention is a mixture of low molecular weight materials which are cured in a mold to yield a thermoset cross-linked composition which possesses many of the attributes of thermosetting polyester resins, particularly when utilized in FRP applications.

U.S. patent application Ser. No. 129,884 filed Mar. 27, 1980 in the names of H. C. Gardner, et al. and titled "Half Esters of Organic Polyols and a Process for Their Preparation" and assigned to the same assignee as the present invention now U.S. Pat. No. 4,263,413, issued Apr. 21, 1981, describes a homogeneous liquid mixture of:

(a) a half ester of an organic polyol characterized by the following empirical formula:

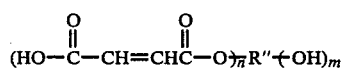  (I)

wherein n is a number having an average value of about 1.8 to less than about 4, m is equal to the free valence of R less the average value of n, R" is the hydroxyl-free residue of an organic polyol which contained from 2 to 4, inclusive, hydroxyl groups, OH, in formula (I), (b) maleic anhydride, (c) an ethylenically unsaturated monomer which forms a liquid homogeneous mixture with and is copolymerizable with the half ester and maleic anhydride, and (d) a basic compound.

The compositions of said U.S. patent application Ser. No. 129,884 are used in the manufacture of composite structures, and particularly in the manufacture of fiber-reinforced plastic compositions.

However, in U.S. patent application Ser. No. 129,884 a manufacturing step is required to pre-react a polyol with an anhydride to form the half ester of the organic polyol.

THE INVENTION

In the present invention it has been found that selected materials can be added directly to a mold, without being pre-reacted, and cured therein to form a rigid article in a short period of time.

Specifically it has been found that a curable physical mixture comprising (a) an active hydrogen containing compound selected from a polyol, a polyamine or an amino alcohol, or mixtures thereof, (b) an unsaturated carboxylic anhydride, and (c) an ethylenically unsaturated monomer combined in specific proportions can be added directly to a mold and cured therein to form high strength rigid shaped articles. These articles are preferably fiber reinforced.

The compositions can optionally contain a catalyst to facilitate the ring opening reaction of the unsaturated carboxylic anhydride by the active hydrogen containing compound.

The active hydrogen containing compound is selected from a polyol, a polyamine, an amino alcohol, or mixtures thereof.

The polyol may be saturated or unsaturated and has a molecular weight (Mn) of from about 62 to about 2000.

The saturated polyol typically contains at least two carbon atoms and may contain from 2 to 9, inclusive, hydroxyl groups. These polyols include alkane diols, triols, tetraols, aliphatic ether containing diols, triols, tetraols, cycloaliphatic containing diols, triols, and tetraols, and aromatic containing diols, triols, and tetraols, and the like. Additionally, these polyols include low molecular weight polymers formed by the addition of unsaturated alcohols to ethylenically unsaturated monomers. Specific illustrations of organic polyols suitable in the practice of this invention include the following: ethylene glycol, diethylene glycol, xylylene glycol, dipropylene glycol, propylene glycol, polypropylene glycols having an average molecular weight of about 150 to about 600 and having from 2 to 5 hydroxyl groups, ethylene oxide/propylene oxide based polyols of molecular weights of about 150 to about 700 and containing from 2 to 5 hydroxyl groups, triethylene glycol, 1,4-cyclohexanedimethanol, neopentyl glycol, 2,2-dimethyl-3-hydroxypropyl 2,2-dimethyl-3-hydroxypropionate, 1,3-butanediol, tetraethylene glycol, the ethylene and propylene oxide adducts of 2,2-bis(4-hydroxphenyl)propane, pentaerythritol, erythritol, glycerine, trimethylol propane, 1,4-butanediol, 1,6-hexanediol, polycaprolactone esters of trimethylol propane in which from about 1.0 to about 6.0 moles of caprolactone are reacted with trimethylol propane, polycaprolactone esters of pentaerythritol in which about up to 10 moles of caprolactone are reacted with pentaerythritol; polycaprolactone esters of dipentaerythritol in which up to 12 moles of caprolactone are reacted with dipentaerythritol, 2-ethyl-1,3-hexanediol, 1,5-pentanediol, tripropylene glycol, 2,2-bis-(4-hydroxycyclohexyl)-propane, 1,2,6-hexane triol, 1,3-propane diol, and the like. The most preferred organic polyols contain at least one primary hydroxyl group, and include diethylene glycol, triethylene glycol, the 2-mole ethoxylate of 2,2-bis-(4-hydroxyphenyl)propane, the polycaprolactone esters of trimethylol propane containing about 1.5 to about 4.0 moles of caprolactone and 1,4-cyclohexanedimethanol. Mixtures of these polyols may also be used.

The polyols formed by the copolymerization of unsaturated alcohols and ethylenically unsaturated monomers include styrene/allyl alcohol copolymers, and vinyl toluene/allyl alcohol copolymers as well as other copolymers of allyl alcohol. These polyols have number average molecular weights (Mn) of from about 200 to about 2000 and contain on the average, 3 to 9 hydroxyl groups.

Unsaturated polyols which may be used include adducts of unsaturated monocarboxylic acids and epoxy resins. For example, the adduct of 2 moles of methacrylic acid with one mole of Bisphenol-A epoxy resin affords an unsaturated diol suitable for use herein. The general formula for this class of unsaturated polyols is as follows:

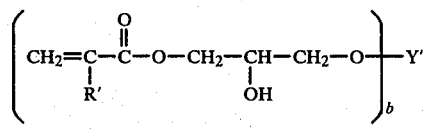

wherein R' is hydrogen or an alkyl radical of 1 to 6 carbon atoms, Y' is a residue of an epoxy resin, and b is between 2 and 4.

The Bisphenol-A epoxy resins have the following structure:

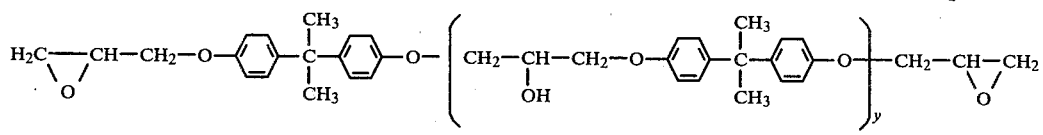

where y has a value from about 0 to about 10.

Other epoxy resins used to make the polyols include epoxidized phenol formaldehyde novolaks, the base catalyzed condensation products of aliphatic polyols with epihalohydrins, such as 1,4-butanediol diglycidyl ether, or epoxidized dienes. Commercial examples of the latter include vinylcyclohexene dioxide (e.g. "ERL-4206" from Union Carbide Corp.), 3,4-epoxycyclohexylmethyl 3,4-epoxycyclohexane carboxylate (e.g. "ERL-4221" from Union Carbide Corp.), 3,4-epoxy-6-methylcyclohexylmethyl 3,4-epoxy-6-methylcyclohexane carboxylate (e.g. "ERL-4201" from Union Carbide Corp.), bis(3,4-epoxy-6-methylcyclohexylmethyl)adipate (e.g. "ERL-4289" from Union Carbide Corp.), bis(2,3-epoxycyclopentyl) ether (e.g., "ERL-0400" from Union Carbide Corp.), dipentene dioxide (e.g. "ERL-4269" from Union Carbide Corp.) and 2-(3,4-epoxycyclohexyl-5,5-spiro-3,4-epoxy) cyclohexanemetadioxane (e.g. "ERL-4234" from Union Carbide Corp.).

Mixtures of epoxy resins may be used.

Other polyols which are either saturated or unsaturated and suitable for use in this invention are made by condensing a dicarboxylic acid or anhydride in the presence of a molar excess of polyol to give a hydroxyl terminated polyester. The polyols include 1,2-propylene glycol, 1,3-butanediol, neopentyl glycol, ethylene glycol, dipropylene glycol, diethylene glycol, 2,2-dimethyl-3-hydroxypropyl 2,2-dimethyl-3-hydroxypropionate, glycerol, and mixtures thereof. The dicarboxylic acids or anhydrides include maleic acid and anhydride, fumaric acid, orthophthalic acid and anhydride, isophthalic acid, terephthalic acid, carbic acid and anhydride, and mixtures thereof. These polyesters may be linear or branched.

Mixtures of saturated or unsaturated polyols are suitable for use herein.

The polyamines suitable for use in this invention are primary or secondary amines with a pK$_b$ of less than 9. Preferably, the amines can be depicted by the following formula:

HN$_2$—R$_1$—NH$_2$ wherein R$_1$ is –(CH$_2$)$_a$, a is an integer from about 5 to about 14, or

The preferred polyamines include the following:

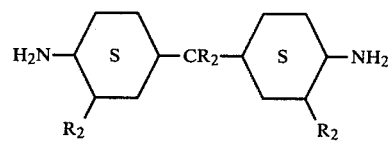

wherein R$_2$ is independently hydrogen, methyl or ethyl.

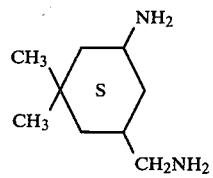

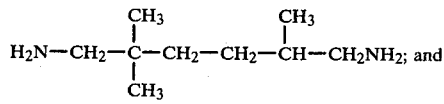

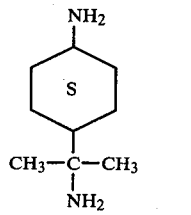

The amines can be used individually or in combination.

The amino alcohols suitable for use in this invention contain at least one aliphatic hydroxyl group and at least one primary or secondary aliphatic amino group. These amino alcohols include the addition products of ethylene or propylene oxide with ammonia or a primary aliphatic amine.

Preferred amino alcohols are of the following structural formula:

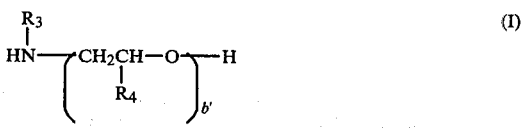
(I)

wherein R$_3$ is hydrogen or an alkyl radical of 1 to 6 carbon atoms, preferably 1 to 4 carbon atoms, R$_4$ is hydrogen or an alkyl radical of 1 to 6 carbon atoms, preferably methyl, and b' is an integer of 1 to 4.

The most preferred amino alcohols include ethanolamine, N-ethyl ethanolamine, and N-butyl ethanolamine.

Mixtures of amino alcohols may also be used.

The composition of this invention includes an unsaturated carboxylic anhydride, such as itaconic anhydride, citraconic anhydride and maleic anhydride. Maleic anhydride is the preferred anhydride. The unsaturated carboxylic anhydride is polymerizable with the ethylenically unsaturated monomer and it reacts with the active hydrogen containing compound to form an ester or an amide.

Suitable ethylenically unsaturated monomers which may be employed in the practice of this invention are one or more monomers which contain a —CH=C< group, and preferably a CH$_2$=C< group. These monomers include styrene and its derivatives and homologues, diallyl phthalate, divinylbenzene, acrylic acid or methacrylic acid and their derivatives such as their esters, amides or nitriles, e.g. methyl acrylate, methyl methacrylate, n-butyl methacrylate, acrylamide, methacrylamide, acrylonitrile, methacrylonitrile, and the like. Also, the monomers include vinyl ethers and esters, e.g. vinyl acetate, vinyl propionate, methyl vinyl ether, and the like, triallyl cyanurate, 1,3-butanediol dimethacrylate, and the like. Mixtures of the aforementioned monomers may be effectively employed in the practice of this invention.

The most preferred ethylenically unsaturated monomer contemplated in the practice of this invention is styrene since it has the most significant commercial utilization for such purposes.

The compositions of this invention may contain a catalyst to facilitate the ring opening reaction of the unsaturated carboxylic anhydride by the active hydrogen containing compound. This catalyst is preferably a base.

The basic compound is selected from an amine or a metal salt of an alcohol or carboxylic acid, or a metal oxide or hydroxide.

The metal salt of the alcohol includes sodium methoxide, potassium ethoxide and lithium isopropoxide. The metal salt of a carboxylic acid includes sodium acetate and potassium benzoate. The metal oxide or hydroxides include the alkali metal hydroxides such as potassium hydroxide, and sodium hydroxide. Magnesium oxide is an example of a suitable metal oxide. Characteristic of all the bases which are suitable for use in this invention is that when 1 gram of the basic compound is dissolved in 100 milliters of water the pH is greater than 7.

A preferred basic compound is a secondary or tertiary amine. These amines have a pK$_b$ in the range of 3 to 12.

Amines suitable for use in the practice of this invention include the following:

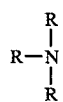

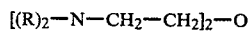

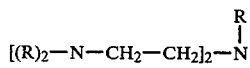

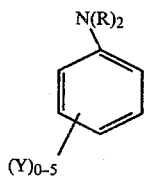

-continued

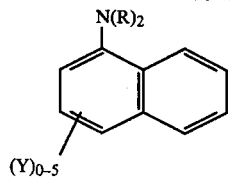

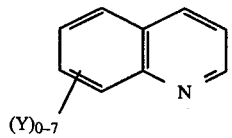

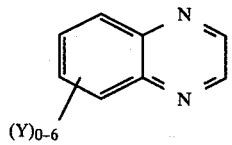

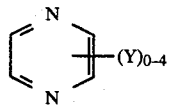

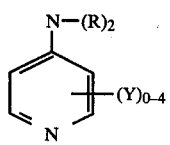

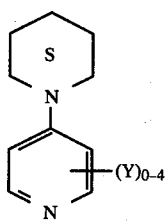

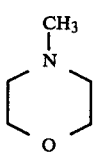

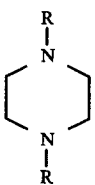

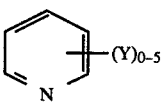

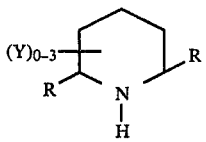

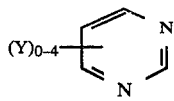

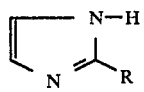

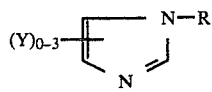

wherein the R's are independently selected from alkyl of 1 to 8 carbon atoms such as $CH_3$, $C_2H_5$, $C_3H_7$, $C_4H_9$, and aralkyl of 7 to 15 carbon atoms such as

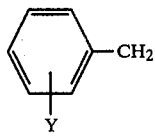

Y is independently selected from alkyl of 1 to 4 carbon atoms, alkoxy of 1 to 4 carbon atoms and halogen.

Additional amines suitable for use herein include 1,5-diazabicyclo[5.4.0]-undec-5-ene; 1,5-diazabicyclo[4.3.0]-non-5-ene.

The basic compound should not be contacted with the unsaturated carboxylic anhydride until just prior to molding the composition.

In order to avoid premature reaction between the components of the mixture, it is desirable to add polymerization inhibitors to the reaction mixture. These polymerization inhibitors include tertiary butyl catechol, hydroquinone monomethyl or monoethyl ether, benzoquinone, tertiary-butyl hydroquinone, methyl hydroquinone and mixtures thereof, such as mixtures of hydroquinone monomethyl ether and benzoquinone. These polymerization inhibitors are used in amounts of from about 30 to about 900 parts per million by weight.

The composition of this invention can be cured by free radical mechanisms such as, electron beam radiation, actinic radiation, azo and peroxide curing agents such as those which are described by Gallagher, et al "Organic Peroxides Review, Plastics Design & Processing," July, 1978, pages 38-42, and August, 1978, pages 60-67, inclusive. The technology disclosed in those two articles is incorporated herein by reference. The choice of the specific peroxide or azo initiators for the purpose of curing the composition of this invention is within the purview of those having skill in this art and the manner in which such peroxides and azo initiators effect a desirable cure is generally characterized in the aforementioned articles.

Illustrative of a few such curing agents are 2,2'-azobis-isobutyronitrile, dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexanoate, t-butylperoctoate, t-butylperneodecanoate, t-butylperbenzoate, t-butylpercrotonate, t-butyl perisobutyrate, di-t-butyl perphthalate, 1,1-bis(t-butylperoxy)-3,3,5-trimethylcyclohexane, and the like.

The concentration of the curing agent is not critical and can be varied within wide limits. As a representative range, the concentration can vary from about 0.25 to about 5.0 weight percent, preferably from about 0.5 to about 2.5 weight percent, and most preferably, from about 0.75 to about 2.0 weight percent, based on the weight of the unsaturated carboxylic anhydride and the ethylenically unsaturated monomer.

The composition of this invention contains from about 5 to about 70, preferably from about 10 to about 65 weight percent of the active hydrogen compound, from about 5 to about 50, preferably from about 10 to about 45 weight percent of the unsaturated carboxylic anhydride and from about 5 to about 70, preferably from about 10 to about 65 weight percent of the ethylenically unsaturated monomer. On a molar basis, the ratio of the unsaturated carboxylic anhydride to the active hydrogen groups (—OH, —$NH_2$ and RNH—) is in the range of from about 0.3 to about 3.0, preferably from about 0.5 to about 2.0. The molar ratio of the unsaturated carboxylic anhydride to the ethylenically unsaturated monomer is in the range of from about 0.1 to about 3.0, preferably from about 0.2 to about 1.5.

The physical mixture of the active hydrogen compound, unsaturated carboxylic anhydride and ethylenically unsaturated monomer may be a homogeneous solution, a two phase liquid mixture, or a dispersion. These physical mixtures are fluid in the temperature range of from about 10° to about 90° C. When a two-phase liquid mixture is used, it is preferably agitated or emulsified prior to injection so that during cure, a homogenous cured resin will result. In dispersions, the solid components should be low melting so that they become liquid during the molding process and result in homogeneous cured resin.

The viscosity of the liquid portion of the mixture ranges from about 0.5 to about 3000, preferably from about 1 to about 1500 centipoises at 25° C.

The composition of this invention is typically prepared by blending the active hydrogen containing compound, the unsaturated carboxylic anhydride and the ethylenically unsaturated monomer in the indicated proportions at temperatures of from about 10° to about 90° C. The unsaturated carboxylic anhydride and ethylenically unsaturated monomer are combined in the presence of a vinyl polymerization inhibitor. If the active hydrogen containing compound is a polyol, it is added to the mixture. A free radical initiator is also added to the mixture which is poured or injected into a heated closed mold containing fibers. Under suitably chosen mold temperatures, the mixtures cure within about twenty minutes, preferably within about fifteen minutes to give a hard rigid cured article.

The simplest formulation includes a polyol, unsaturated carboxylic anhydride, an ethylenically unsaturated monomer, a free radical initiator, and a vinyl polymerization inhibitor. In this invention, less than about ten percent of the product resulting from the reaction of polyol and anhydride occurs prior to injecting the resin into a mold. The structure of the polyol determines the speed of reaction with anhydride at room temperature. Unhindered primary hydroxyl groups react more rapidly than secondary or tertiary hydroxyl groups. However, within a few minutes at room temperature, typical polyols in the compositions of this invention react with the anhydride to the extent of only a few percent.

The rate of the reaction between the polyol and the anhydride can be accelerated by raising the temperature or by using a basic compound as a catalyst. Under these conditions, rapid mixing prior to injection of the components of the mixture into the mold is desirable. Such mixing can be effected by using an inline mixer to blend the components in the two separate accumulator zones in the apparatus of the Figure. Alternatively mixing can be effected by using an impingement mixing head of the type found in commercially available polyurethane RIM machines. Two accumulator zones are required to separate the active hydrogen compound from the anhydride. The ethylenically unsaturated monomer can be in either zone or even in a separate zone.

If amines or amino alcohols are used as the active hydrogen compounds, the reaction of these materials with the anhydride to give a ring opened product is much faster than with polyols. The same rapid mixing techniques are required for these materials as with reactive polyols or base catalyzed polyol containing formulations.

Certain formulations of active hydrogen compound, anhydride and ethylenically unsaturated monomer can prereact to form a material which is more difficult to mold than the curable physical mixture of this invention. For example, the reaction product of two moles of maleic anhydride with diethylene glycol is a viscous oil which does not dissolve in an equal weight of styrene at temperatures below 70° F. The incompatability of the above reaction product and styrene makes it difficult to inject such a formulation and adequately disperse it to obtain a uniform cured resin. On the other hand, a mixture of maleic anhydride, diethylene glycol and styrene, in the above proportions, affords a homogeneous low viscosity solution which can be readily injected into a mold to form unifrom molded articles. In the molding process, addition of the hydroxyl groups to the anhydride occurs simultaneously with the vinyl polymeriation of the anhydride with the ethylenically unsaturated monomer. This results in a uniform cured resin.

The compositions of this invention can be cured neat or in combination with fillers, pigments, and fibers, such as fiberglass, carbon fibers and aromatic polyamide fibers (such as aramid fibers sold by E. I. DuPont Nemours, Wilmington, Del. and sold under the trademark Kevlar), hollow glass or phenolic resin spheres, and the like. The composition of this invention are particularly useful for the manufacture of rigid fiber reinforced molded articles.

These compositions may be molded by a number of different processes and apparatus. A preferred procedure for producing a molded article from the compositions of this invention is described in U.S. patent application Ser. No. 135,906 entitled "Molding Process and Apparatus Therefore," and filed on Apr. 14, 1980 in the same name of R. Angell, Jr., which is incorporated herein by reference. In this application, a process for rapidly fabricating fiber reinforced thermoset resin articles is described. The fiber reinforcement is comprised of one or more fibers with a melting point or a transition temperature above about 130° C. The process comprises the steps of (a) providing one or more fibers with a melting point or a glass transition temperature above about 130° C. in the form of an interlocked mass in a heatable matched metal die mold, (b) providing in one or more accumulator zones, a liquid body of a thermosettable organic material having a viscosity determined at 120° C., in the absence of curing agent therefore, of less than about 50 centipoise, and which is curable upon heating to a thermoset resin composition, the viscosity of said liquid body being maintained essentially constant in the accumulator zone by keeping its temperature below that at which curing of said material is substantial, (c) closing the mold containing the web, (d) injecting at least a portion of said thermosettable organic material under pressure from said accumulator zone(s) into the mold to thereby fill the cavity in said mold, (e) initiating the curing of said material in said mold by subjecting the material to a temperature above the temperature at which the curing of said material is initiated, by heating the mold, and (f) opening said mold and removing the cured thermoset article therefrom.

In said U.S. patent application Ser. No. 135,906 the apparatus comprises: (a) a heatable matched die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, (d) cooling means associated with the means for controlling the injection of such liquid to such cavities, whereby the temperature of the liquid in such injection means is maintained substantially below the temperature of the mold.

Another apparatus which may be used is a pressure bag mold. The molded article produced from the composition of this invention may contain from about 15 to about 80, preferably from about 35 to about 70 weight percent of fibers.

Due to the low viscosities of the compositions of this invention, they readily flow through and about and within the total confines of the mold and the fibrous material contained therein to effect a uniform distribution of the reaction product within the ultimate molded product.

The temperature in the mold varies from room temperature to 200° C. The choice of mold temperature is influenced by the free radical initiator and by the exothermic nature of the active hydrogen component/anhydride reaction. Typically, the mold temperature is between 100° and 170° C.

The mold is constructed so that escape of liquid components is prevented. The pressure generated by the reactants during the cure process must be contained in the mold and preferably an external pressure is applied to the liquid reaction mixture during cure to help wet the fibrous reinforcement and prevent formation of voids in the cured article.

The FIGURE is an elevated view with partial cross-sections of a molding apparatus containing accumulators, and a mold which can be used to mold the compositions of this invention.

FIG. 1, depicts a side view of a platen press A. The press comprises a base 1 upon which the remainder of the structure of the apparatus is positioned. The press comprises platens 3 and 5 having the capacity of being closed to one another by a hydraulic cylinder 7 which moves platen 3 into closure position relative to platen 5. Platen 5 is a fixed platen. Between platens 3 and 5 are female die 13 and male die 11. Each of die 13 and 11 contain a plurality of electric cartridge heaters 12 which heat the mold when the dies are closed. Columns 9 (four are affixed on base 1) support platen 5 and guide the path of moveable platen 3. Situated in a hole disposed centrally of fixed platen 5 is injection nozzle 21 which is provided with a water cooled jacket. Port 23 provides for water inlet and port 33 for water removal in cooling injection nozzle 21. Positioned within the center of nozzle 21 is closure rod 45. Closure rod 45 is affixed to cylinder rod 49 which is controlled by raising and lowering hydraulic cylinder 51. Post 22, suspended above platen 5 supports cylinder 51.

Materials are supplied to injection nozzle 21 through pipes 19 or 39, from accumulators 15 and 35, respectively. Additional accumulators may be provided in the apparatus to provide other materials which can be injected into the mold in the manner depicted in the FIGURE. Accumulators 15 and 35 are open cups into which the resinous material is supplied. Also, a continuous feed may be supplied to accumulators 15 and 35 from sources outside of the accumulator, such as a mixing tank which contains a feed pump or a compression pump. Located above accumulators 15 and 35, are pistons 17 and 37, driven by hydraulic cylinders 31 and 47, respectively. The pistons shown in the FIGURE are in an open position from the accumulators so that materials can be poured into the accumulator cups. The open position is not necessarily in appropriate position for the pistons, if the accumulator is supplied with material from its side and from a source outside of the accumulator. In such an embodiment, the pistons would be positioned within the upper surface of the accumulator to act as a seal for the materials contained within the accumulator and for more rapid closure of the accumulator in applying pressure for injecting materials into the mold. Pistons 17 and 37 contain O-rings 18 and 38, respectively, which seal the space between the outer surface of the pistons and the interior surface of the accumulators, to prevent resinous or other materials contained in the accumulators from entering the space between the respective walls. Accumulator 15 sets upon support plate 27 which is supported by posts 29 which supports cylinder 31. Accumulator 35 sits upon plate 36 which is held in position by posts 43 which support cylinder 47. The accumulator assembly posts 29 and 43 rest upon platform 25 and 41, respectively.

In the FIGURE, nozzle 21 as shown, extends into and through the fixed press platen 5. Nozzle 21 is cooled in order to prevent premature thermosetting of the resinous material before injection into the mold.

The apparatus depicted in the FIGURE is operated as follows: Material is transferred into accumulator cup 15 and/or accumulator 35 to provide a charge which is suitable to fill the mold cavity. Water flows in the interior of the jacket surrounding injection nozzle 21 through ports 23 and 33. Heaters 12 in the mold are activated to provide a temperature of, for example, 110° C. A web of fibrous material is supplied to the top of the male die within the framework of the mold. The web is cut to the dimension of the die so that when the mold is closed, essentially all of the cavity contains the required amount of fibrous web. The mold is then closed to receive resinous material. If a one component resin is used, the material is transported by lowering piston 17 into accumulator 15 with pressure, which drives the resinous material from accumulator 15 through pipe 19 into injection nozzle 21. The passageway of the material from pipe 19 to the mold is blocked by the presence of closure rod 45. Rod 45 extends below the point at which pipe 19 supplies resinous materials to the injection nozzle. When rod 45 is raised above the point of injection of the material to the injection nozzle, the material flows into the mold.

The resinous material is then passed from the nozzle into the mold under a pressure sufficient to transport it to the extremities of the mold.

After the full charge in the accumulator is supplied to the mold, the mold is opened after the resinous material therein is in a thermoset condition and a molded article removed therefrom.

If a two component resin is used, the components in accumulators 15 and 35 are transported by lowering pistons 17 and 37 simultaneously. The resin components meet at injection nozzle 21, which contains a mixer (not shown) to mix the streams prior to injection into the mold. The mixer can be purged between injections, if needed.

The following Examples serve to give specific illustration of the practice of this invention but they are not intended in any way to act to limit the scope of this invention.

EXAMPLES

In all of the Examples, maleic anhydride was warmed to 55° C. prior to blending it with the other components of the mixture. The mixtures were molded within about two hours after preparation.

The composites molded from the mixtures in the Examples were tested for the following properties: tensile strength, tensile modulus, and tensile elongation according to ASTM D-638, flexural strength and flexural modulus according to ASTM D-790 and heat deflection temperature according to ASTM D-648.

Also, the acid numbers and hydroxyl numbers of the polyols in the Examples were determined by titrimetric methods and are reported in units of milligrams of KOH per gram of sample.

EXAMPLES 1 TO 9

In these Examples, fiber reinforced composites were made in a square mold cavity in a heated press as described in the FIGURE. In this procedure a bed of chopped strand mat was placed into the heated mold. After the press was closed, liquid resin was forced into the mold from an accumulator zone. The resin flowed around and through the bed of fibers prior to curing. Cure was initiated by decomposition of the free radical initiator present in the formulation. After a fixed period of time, the press was opened and a rigid glass reinforced composite was removed.

EXAMPLE 1

A homogeneous liquid resin mixture was prepared by combining the following ingredients at about 25° C.:
70.6 g of diethylene glycol,
130.4 g of maleic anhydride,
207.8 g of styrene,
0.10 g of methyl hydroquinone, 1.1 g of Zelec UN (an organophosphate mold release sold by E. I. duPont de Nemours, Wilmington, Del.), and 4.1 g of t-butyl perbenzoate.

The solution contained a molar ratio of hydroxyl groups to maleic anhydride to styrene of 0.5/1.0/1.5. The solution temperature was 30° C.

Six plies (87 g) of PPG type AKM chopped strand mat (sold by PPG Industries, Pittsburgh, Pa.) with dimensions of $6\frac{7}{8} \times 6\frac{7}{8}$ inches were placed in a $7 \times 7$ inch mold cavity in the heated press. The press was maintained at 140° C. After the press was closed, a portion of the resin formulation was injected into the mold in 5 seconds. The resin was then pressurized at 250 psi for the next 85 seconds. The pressure on the resin was then released. After an additional 90 seconds, the press was opened. A nearly transparent rigid composite having a thickness of $\frac{1}{8}$ inch was removed. The composite weighed 173 g.

The part was tested to determine the mechanical properties.

The results are shown in Table I.

EXAMPLE 2

A clear yellow solution was obtained by gently warming a mixture of the following ingredients at a temperature of 50° C.:

33.0 g of 2,2-dimethyl-3-hydroxypropyl 2,2-dimethyl-3-hydroxypropionate, 33.0 g of maleic anhydride, 54.0 g of styrene, 0.5 g of Zelec UN mold release, 0.06 g of hydroquinone, and 1.8 g of t-butylhydroperoxide (90% active).

This mixture had a molar ratio of hydroxyl groups to maleic anhydride to styrene of 0.96/1.0/1.54. As soon as a solution was obtained, it was injected into a bed of 104 grams of one inch chopped roving (made from OCF type 447 glass sold by Owens-Corning Fiberglas, Toledo, Ohio) containing 6.7 weight percent excess polyvinyl acetate binder. The injection time was 5 seconds. The pressure on the resin was maintained at 30 to 90 psi. To cure the composite, the press temperature was maintained at 120° C. for 5 minutes, raised to 150° C. over the next 5 minutes, and then maintained at 150° C. for an additional 5 minutes. When the press was opened a $\frac{1}{8}$ inch thick composite was removed.

The composite was tested for flexural properties.

The results are shown in Table I.

EXAMPLE 3

A homogeneous liquid resin was prepared by blending the following ingredients at about 25° C.:

61.2 g of the 4-mole ethoxylate of Bisphenol-A, 7.2 g of molten 1,4-cyclohexanedimethanol (a mixture of cis and trans isomers melting at about 30° C.), 39.2 g of maleic anhydride, 62.5 g of styrene, 0.07 g of t-butyl hydroquinone, 1.7 g of Zelec UN mold release, and 1.7 g of t-butyl perbenzoate.

This solution had a molar ratio of hydroxyl groups to maleic anhydride to styrene of 1.0/1.0/1.5. Its temperature was 35° C. Immediately before the resin was injected into a bed of 87 grams of PPG type AKM glass mat, it was mixed with 0.3 g of pyridine to catalyze the ring opening reaction between maleic anhydride and the polyols. The resin was injected into the mold in 5 seconds, pressurized at 250 psi for 2 minutes, and then allowed to cure for 2 more minutes. When the press was opened, a nearly transparent part was removed.

The part was tested to determine the mechanical properties.

The results are shown in Table I.

EXAMPLE 4

A homogeneous solution was prepared by mixing the following ingredients:

82 g of a styrene/allyl alcohol copolymer (RJ-101, sold by Monsanto Co.), 73 g of styrene, and 0.08 g of t-butyl hydroquinone.

The mixture was warmed to 70° C. to dissolve the copolymer and was then cooled to about 25° C. The styrene/allyl alcohol copolymer had a molecular weight ($M_n$) of 1,150 and contained a molar ratio of about 1.5 moles of styrene per mole of allyl alcohol. The solution was blended at about 25° C. with the following ingredients:

41.2 g of maleic anhydride, 2.0 g of Zelec UN mold release, and 2.0 g t-butyl perbenzoate.

The resulting mixture had a temperature of about 30° C. and a molar ratio of hydroxyl groups to maleic anhydride to styrene of 0.66/1.0/1.67. A portion of the solution was injected into 84.3 g of PPG type AKM glass mat in the mold cavity which was maintained at 140° C. A hydrostatic pressure of 250 psi was applied to the resin for 2 minutes. The composite was allowed to cure for an additional 2 minutes. Then a nearly transparent rigid composite having dimensions of $7 \times 7 \times \frac{1}{8}$ inches and weighing 64 grams was removed from the mold.

The composite was tested to determine the mechanical properties.

The results are shown in Table I.

EXAMPLE 5

A homogeneous solution was prepared by blending the following ingredients at 65° C.:

500 g of the styrene/allyl alcohol copolymer described in Example 4, 500 g of styrene, and 0.25 g of methyl hydroquinone.

After the solution was cooled to room temperature, a 140 g portion was blended with the following ingredients:

23.6 g of maleic anhydride, 34 mg of t-butyl hydroquinone, 1.7 g of Zelec UN mold release, and 1.7 g of t-butyl perbenzoate.

The resulting mixture had a temperature of about 30° C. and a molar ratio of hydroxyl groups to maleic anhydride to styrene of 1.0/1.0/2.84.

A $7 \times 7 \times \frac{1}{8}$ inch composite was prepared by injecting the resin into a bed of 83 g of PPG type AKM mat in the mold cavity, which was maintained at 140° C. Injection of the resin took 6 seconds. 250 psi pressure was applied to the resin for 2.5 minutes. After an additional 2.5 minutes in the mold, the part was removed. It was rigid and nearly transparent.

The composite was tested to determine the mechanical properties.

The results are shown in Table I.

EXAMPLE 6

In this example, a mixture of predominantly hydroxyl-terminated polyesters comprised the polyol portion of the resin. Two polyester polyols were used.

Polyester polyol I was prepared by reacting 1.4 moles of trimellitic acid with 3 moles of ethylene glycol and 6 moles of diethylene glycol. The reactants were heated at 180° to 220° C. for 11 hours to esterify the acid. The resulting mixture was then heated at about 180° C. for 3 hours at 40 mm of mercury to remove excess glycol. The residue was a branched polyester polyol with a hydroxyl number of 404 and an acid number of 13.

Polyester polyol II was prepared by condensing 9.8 moles of maleic anhydride with 20.7 moles of propylene glycol at 200° to 225° C. for 6 hours, and then removing excess glycol under a vacuum. This polyol had a hydroxyl number of 213 and an acid number of 1.5.

A thermosetting resin composition was prepared by blending the following ingredients at a temperature of about 25° C.:
58.4 g of polyester polyol I,
48.0 g of polyester polyol II,
41.2 g of maleic anhydride,
89.6 g of styrene,
0.05 g of t-butyl hydroquinone,
2.4 g of Zelec UN mold release, and
2.4 g of t-butyl perbenzoate.

The molar ratio of hydroxyl groups to maleic anhydride to styrene was about 1.43/1.0/2.05.

A composite was prepared by injecting a portion of the resin into a 7×7×⅛ inch mold cavity maintained at 140° C. and containing 83 g of PPG type AKM glass mat.

The resin was injected in 5 seconds, pressurized at 250 psi for 85 seconds, and then allowed to cure for an additional 90 seconds. At the end of this period, the press was opened and a rigid, translucent composite was removed.

The composite was tested to determine the mechanical properties.

The results are shown in Table I.

EXAMPLE 7

In this sample, the polyol portion of the resin contained a mixture of a neopentyl glycol and a predominantly hydroxyl-terminated unsaturated polyester oligomer. In addition, a basic compound, i.e., 1-methylimidazole, was added to catalyze the maleic anhydride/polyol ring opening reaction.

The mixture of the polyester and neopentyl glycol was prepared in the following manner:

A 5-liter flask equipped with a paddle stirrer, thermometer, nitrogen inlet and outlet, a 12 inch packed distillation column, and an electric heating mantle was charged with 294 g of maleic anhydride, 443 g of phthalic anhydride, 1249 g of neopentyl glycol, and 228 g of propylene glycol. The mixture was carefully warmed to melt all of the reactants. It was heated at a temperature of 180° to 206° C. for nine hours as 84 g of water distilled from the mixture. The residue in the flask was then heated under vacuum to remove a portion of the excess glycol and additional water. Almost all of the glycol in the distillate was neopentyl glycol. The residue in the flask was a clear, light yellow liquid with a hydroxyl number of 350. This product consisted of about 1480 g of the oligomer and 310 g of unreacted neopentyl glycol. The acid number of the mixture was 11.4 when measured in an aqueous pyridine solvent. The molar ratio of neopentyl glycol to propylene glycol in the oligomer was 2.6 to 1.

A thermosetting resin composition was prepared by combining the following ingredients at a temperature of about 25° C.

64.1 g of the mixture of polyester oligomer and neopentyl glycol prepared above,
39.2 g of maleic anhydride,
62.5 g of styrene,
0.07 g of t-butyl hydroquinone,
1.6 g of Zelec UN mold release, and
1.6 g of t-butyl perbenzoate.

The resulting mixture had a temperature of about 28° C. and an hydroxyl group to maleic anhydride to styrene stoichiometry of 1.0/1.0/1.5. Immediately before the resin was injected into a heated mold, it was mixed with 0.4 g of pyridine. The resin was injected into a mold cavity containing a bed of 87 g of PPG type AKM glass mat and maintained at 140° C. The resin was injected in 5 seconds, pressurized at 250 psi for 2 minutes, and then allowed to cure for an additional 2 minutes. The press was opened and a translucent, rigid composite of dimensions 7×7×⅛ inch was removed from the mold. The composite weighed 170 g.

The composite was tested to determine the mechanical properties.

The results are shown in Table I.

EXAMPLE 8

The resin formulation of Example 5 was used in this Example. It was mixed with 0.34 g of 1-methylimidazole immediately prior to injection into the mold. The resin was then injected into 82 g of PPG type AKM glass mat in a mold maintained at 140° C. The mixture was injected in 5 seconds, pressurized at 250 psi for 2.5 minutes, and allowed to cure for an additional 2.5 minutes. When the press was opened, a rigid, nearly transparent composite was removed. The composite, which had dimensions of 7×7×⅛ inches, was tested to determine the mechanical properties.

The results are shown in Table I.

EXAMPLE 9

This example describes the preparation of a rigid fiber-reinforced composite using a resin composition containing a solid component at room temperature. In the molding process, the solid component melted and reacted with the other components in the mixture.

A yellow solution was prepared by combining the following ingredients—25.6 g of maleic anhydride, 54.0 g of styrene, 0.5 g of Zelec UN mold release, 0.06 g of hydroquinone, and 1.8 g of t-butyl hydroperoxide. To this was added 40.4 g of a finely divided diol, i.e., the 2-mole ethoxylate of Bisphenol-A.

The molar ratio of hydroxyl groups to maleic anhydride to styrene was about 0.98/1.0/1.99.

The mixture containing solid diol was injected in 15 seconds into a bed of 99 g of one inch OCF type 447 glass fiber containing 6.7 wt. percent of excess poly(vinyl acetate) binder. A hydrostatic pressure of from 30 to 100 psi was applied to the resin for five minutes and was then released. The part was cured in the mold for 15 minutes. The mold temperature was held at 120° C. for 5 minutes, increased to 150° C. over a 5 minute period, and held at that temperature for 5 more minutes. Then the mold was opened and a translucent, fiber reinforced composite with dimensions of about 8×8×⅛ inch was removed. The sample weighed about 193 g.

The flexural properties of the composite were determined.

The results are shown in Table I.

The data in Table I shows that the compositions of this invention afford fiber reinforced composites of high stiffness and strength. These high properties are obtained in unexpectedly short cure times. Due to the low viscosity of many of the compositions, high levels of fiber reinforcement can be incorporated into the molded article.

part with approximate dimensions of 10×10×150 inches was removed.

The composite was tested to determine the mechanical properties. The results are shown in Table II.

EXAMPLE 11

Another 120 g portion of the homogeneous liquid mixture prepared in Example 10 was blended with 1.2 g of t-butyl perbenzoate. Immediately before this resin was used to make a composite, it was treated with 0.24 g of 1-methylimidazole and rapidly agitated to disperse the maleic anhydride/polyol reaction catalyst. The

TABLE I

| | Example No. | | | | | | | | |
|---|---|---|---|---|---|---|---|---|---|
| | 1 | 2 | 3 | 4 | 5 | 6 | 7 | 8 | 9 |
| | | | | | Polyol(s) | | | | |
| | diethylene glycol | 2,2-dimethyl-3-hydroxypropyl 2,2-dimethyl-3-hydroxypropionate | 4-mole ethoxylate of Bisphenol-A and 1,4-cyclohexane-dimethanol | styrene/allyl alcohol co-polymer | styrene/allyl alcohol co-polymer | mixture of polyester polyol I and polyester polyol II | mixture of neopentyl glycol and a polyester polyol | styrene/allyl alcohol co-polymer | 2-mole ethoxylate of Bis-phenol-A |
| Total Cure Time (min.) | 3 | 15 | 4 | 4 | 5 | 3 | 4 | 5 | 15 |
| COMPOSITE PROPERTIES | | | | | | | | | |
| Tensile Strength ($10^3$ psi) | 26.1 | — | 25.9 | 22.4 | 19.7 | 23.6 | 22.6 | 18.0 | — |
| Tensile Modulus ($10^6$ psi) | 1.91 | — | 1.53 | 1.38 | 1.55 | 1.63 | 1.31 | 1.29 | — |
| Elongation (%) | 1.6 | — | 1.9 | 2.1 | 1.6 | 1.7 | 2.2 | 1.8 | — |
| Flexural Strength ($10^3$ psi) | 40.9 | 30.4 | 48.3 | 42.5 | 41.0 | 35.6 | 38.1 | 43.8 | 42.6 |
| Flexural Modulus ($10^6$ psi) | 1.69 | 1.27 | 1.69 | 1.78 | 1.52 | 1.36 | 1.66 | 1.68 | 1.81 |
| Glass Content (wt. %)[a] | 53 | 44 | 54 | 54 | 51 | 49 | 51 | 50 | 51 |

[a]Determined on flex bars

EXAMPLES 10 TO 25

In Examples 10 to 25, fiber reinforced composites were prepared using a pressure bag mold. In this apparatus, a bed of glass fibers was placed in a heated cavity. The thermosetting resin mixture was poured onto the bed of glass fibers and the cavity was sealed. Pressure was applied to the cavity by admitting nitrogen gas under the bottom platen. At the end of the molding cycle, the nitrogen pressure was released and the press was opened. The composite, which had typically been molded between Mylar or aluminum sheets coated with Polyplastex 595 mold release (sold by Polyplastex United, Union, N.J.) was then removed from the press.

EXAMPLE 10

A homogeneous liquid mixture was prepared by blending the following ingredients at a temperature of about 40° C.:
218.0 g of the polycaprolactone ester of trimethylol propane containing 1.5 moles of caprolactone,
192.8 g of maleic anhydride
411.3 g of styrene,
0.41 g of t-butyl hydroquinone, and
4.1 g of Zelec UN mold release.

Within ten minutes, a 120 g portion of the mixture was blended with 1.2 g of t-butyl perbenzoate to give a thermosetting resin composition.

The molar ratio of hydroxyl groups to maleic anhydride to styrene in this formulation was 1.11/1.0/2.0.

The resin was immediately poured onto a bed of 137 g of PPG type AKM glass mat approximately 10 inches square in the mold preheated to 135° C. The mold was closed in 10 seconds and pressurized to 300 psi with nitrogen. After 6 minutes the pressure was released and the mold was opened. A nearly transparent, fully cured resin formulation was poured into a bed of 155 g of PPG type AKM glass mat in the mold preheated to 135° C. The mold was closed in 10 seconds and pressurized to 300 psi with nitrogen. After 6 minutes, the pressure was released and the mold was opened. A tan, nearly transparent rigid composite with approximate dimensions of 10×10×⅛ inches was removed.

The composite was tested to determine the mechanical properties.

The results are shown in Table II.

EXAMPLE 12

A thermosetting resin mixture was prepared by blending the following ingredients at 40° C.:
111.7 g of molten 1,4-cyclohexanedimethanol (a mixture of cis and trans isomers),
152.0 g of maleic anhydride,
263.8 g of styrene,
2.64 g of Zelec UN mold release, and
0.26 g of t-butyl hydroquinone.

The mixture consisted of 2 liquid layers. The molar ratio, in the overall mixture, of hydroxyl groups to maleic anhydride to styrene was 1.0/1.0/1.63. A 120 g portion of the mixture was blended with 1.2 g of t-butyl perbenzoate to make a thermosetting resin composition.

A composite was made by briskly agitating the resin mixture immediately prior to pouring it onto a bed of 150 g of PPG type AKM chopped strand glass mat in the mold preheated to 135° C. The mold was sealed in 10 seconds and pressurized to 250 psi with nitrogen. After 7 minutes, the pressure was released and the mold was opened. A nearly transparent, rigid composite with approximate dimensions of 10×10×⅛ inches was removed. The cured resin was homogeneous.

The composite was tested to determine the mechanical properties.

The results are shown in Table II.

EXAMPLE 13

A 120 g portion of the two-phase liquid mixture of Example 12 was blended with 1.2 g of t-butyl perbenzoate. Immediately before the resin was used to make a composite, 0.24 g of 1-methylimidazole was added and the mixture rapidly agitated. The resulting emulsion containing the maleic anhydride/polyol reaction catalyst was poured onto a bed of 162 g of PPG type AKM glass mat in the mold preheated to 135° C. The mold was closed in 10 seconds and pressurized to 250 psi with nitrogen. After 6 minutes the pressure was released and the mold was opened. A tan, nearly transparent composite with approximate dimensions of $10 \times 10 \times \frac{1}{8}$ inches was removed.

The composite was tested to determine the mechanical properties.

The results are shown in Table II.

EXAMPLE 14

A thermosetting resin mixture was prepared by blending the following ingredients at a temperature of about 25° C.:
12.7 g of molten 1,4-cyclohexanedimethanol (a mixture of cis and trans isomers),
15.9 g of the polycaprolactone ester of trimethylol propane containing 1.5 moles of caprolactone,
31.4 g of maleic anhydride,
60.0 g of styrene,
1.2 g of Zelec UN mold release.
0.06 g of t-butyl hydroquinone, and
1.2 g of t-butyl perbenzoate.
The mixture consisted of two liquid layers. The molar ratio of hydroxyl groups to maleic anhydride to styrene in the mixture was 1.05/1.0/1.80.

A composite was made by pouring the briskly agitated resin mixture onto a bed of 157 g of PPG type AKM chopped strand glass mat in the mold which was preheated to 135° C. The mold was sealed in 10 seconds and pressurized to 300 psi with nitrogen. After 5 minutes the pressure was released and the mold was opened. A nearly transparent, rigid composite with approximate dimensions of $10 \times 10 \times \frac{1}{8}$ inches was removed. The cured resin was homogeneous.

The composite was tested to determine the mechanical properties.

The results are shown in Table II.

EXAMPLE 15

The thermosetting resin prepared in Example 14 was used in this Example. Immediately before the resin was injected into the mold, 0.24 g of 1-methylimidazole was added to it and the mixture was rapidly agitated. A composite was made by pouring the resin containing the maleic anhydride/polyol reaction catalyst onto a bed of 162 g of PPG type AKM chopped strand glass mat in the mold preheated to 135° C. The mold was sealed in 10 seconds and pressurized to 300 psi with nitrogen. After 5 minutes, the pressure was released and the mold was opened. A nearly transparent, tan composite with approximate dimensions of $10 \times 10 \times \frac{1}{8}$ inches was removed. The cured resin was homogeneous.

The composite was tested to determine the mechanical properties.

The results are shown in Table II.

EXAMPLE 16

The thermosetting resin mixture prepared in Example 14 was used in this Example except that t-butyl hydroperoxide (90 percent active) was substituted for t-butyl perbenzoate.

A composite was made by pouring the resin mixture onto a bed of 170 g of PPG type AKM chopped strand glass mat in the mold preheated to 135° C. The mold was sealed in 10 seconds and pressurized to 300 psi with nitrogen. Afer 8 minutes, the pressure was released and the mold was opened. A nearly transparent rigid composite with approximate dimensions of $10 \times 10 \times \frac{1}{8}$ inches was removed.

The composite was tested to determine mechanical properties.

The results are shown in Table II.

EXAMPLE 17

This example describes the use of an aliphatic diamine as a component of the active hydrogen compound used to make a fiber reinforced composite.

A homogeneous solution was prepared by blending the following ingredients at a temperature of about 25° C.
10.51 g of bis(4-aminocyclohexyl)methane,
21.22 g of diethylene glycol, and
52.07 g of styrene.

A second homogeneous solution was prepared by blending the following ingredients at a temperature of 40° C.:
52.07 g of styrene,
49.03 g of maleic anhydride,
2.8 g of Zelec UN mold release,
0.092 g of t-butyl hydroquinone,
1.85 g of t-butyl perbenzoate.
These solutions were mixed immediately before they were poured onto a bed of 226 g of PPG type AKM glass mat in the mold preheated to 135° C. This resin formulation contained a molar ratio of active hydrogen groups (—OH and —NH$_2$) to maleic anhydride to styrene of 1.0/1.0/2.0. The mold was closed in 10 seconds and pressurized to 300 psi with nitrogen. After 8 minutes the pressure was released and the mold was opened. A yellow rigid composite with approximate dimensions of $10 \times 10 \times 0.15$ inches was removed. The composite was tested to determine the mechanical properties.

The results are shown in Table II.

TABLE II

| | Example No. | | | | | | | |
|---|---|---|---|---|---|---|---|---|
| | 10 | 11 | 12 | 13 | 14 | 15 | 16 | 17 |
| | | | | | Active Hydrogen Compound(s) | | | |
| | poly-caprolactone ester | poly-caprolactone ester | 1,4-cyclohexane-dimethanol | 1,4-cyclohexane-dimethanol | 1,4-cyclohexane-dimethanol and polycaprolactone ester | 1,4-cyclohexane-dimethanol and polycaprolactone ester | 1,4-cyclohexane-dimethanol and polycaprolactone ester | diethylene glycol and bis (4-aminocyclohexyl) methane |
| Total Cure Time (min.) | 6 | 6 | 7 | 6 | 5 | 5 | 8 | 8 |
| COMPOSITE PROPERTIES | | | | | | | | |
| Tensile Strength ($10^3$ psi) | 27.9 | 25.2 | 26.1 | 28.2 | 26.0 | 27.2 | 28.8 | 28.3 |
| Tensile Modulus ($10^6$ psi) | 1.82 | 1.68 | 1.72 | 1.90 | 1.97 | 1.73 | 2.07 | 1.80 |
| Elongation (%) | 1.8 | 1.8 | 1.8 | 1.8 | 1.5 | 1.9 | 1.6 | 1.9 |
| Flexural Strength ($10^3$ psi) | 50.6 | 44.8 | 46.2 | 49.2 | 46.3 | 45.4 | 49.0 | 49.0 |
| Flexural Modulus ($10^6$ psi) | 1.96 | 1.65 | 2.04 | 1.98 | 1.74 | 1.67 | 1.85 | 2.10 |
| Glass Content (wt. %)[a] | 54 | 52 | 56 | 55 | 55 | 56 | 56 | 58 |

[a] Determined on flex bars

EXAMPLES 18 TO 21

This series of examples shows the effect of hydroxyl group to maleic anhydride stoichiometry on the properties of fiber reinforced composites made using a diol. A series of composites with approximate dimensions of 10×10×⅛ inches was prepared from a resin composition containing diethylene glycol. In the resin formulations, the molar ratio of hydroxyl groups to maleic anhydride was the following: 0.5, 1.0, 1.5, and 2.0. The maleic anhydride to styrene stoichiometry in all the formulation was 1.00:1.45. The pressure bag mold as described above was used. The resin was poured onto a bed of PPG type AKM glass mat. Composites were molded for 8 minutes at 135° C. using a nitrogen pressure of 250 psi. The resin formulations are listed in Table III.

The composites were tested to determine flexural strength and flexural modulus according to ASTM D-790, heat deflection temperature according to ASTM D-648, and solvent resistance. The solvent resistance was determined by soaking 1×4 inch test specimens in acetone for 16 hours and measuring weight gains. Samples with the highest crosslink densities had the smallest weight gains. The results are shown in Table IV.

The data in Table IV shows that composites with a good combination of mechanical properties are obtained where the hydroxyl group to maleic anhydride stoichiometry is between about 0.5 and about 2.0. The preferred stoichiometry of hydroxyl groups to maleic anhydride is between about 0.5 to about 1.5.

TABLE III

RESIN FORMULATIONS

| | EXAMPLE | | | |
|---|---|---|---|---|
| | 18 | 19 | 20 | 21 |
| OH/maleic anhydride stoichiometry | 0.5 | 1.0 | 1.5 | 2.0 |
| Diethylene glycol (g) | 10.6 | 21.1 | 31.6 | 42.2 |
| Maleic Anhydride (g) | 38.9 | 38.9 | 38.9 | 38.9 |
| Styrene (g) | 60.0 | 60.0 | 60.0 | 60.0 |
| Zelec UN (g) | 0.6 | 0.6 | 0.6 | 0.6 |
| t-butyl hydroquinone (g) | 0.06 | 0.06 | 0.06 | 0.06 |
| t-butyl perbenzoate (g) | 1.1 | 1.2 | 1.3 | 1.4 |

TABLE IV

PROPERTIES OF COMPOSITES

| | EXAMPLE | | | |
|---|---|---|---|---|
| | 18 | 19 | 20 | 21 |
| OH/maleic anhydride stoichiometry | 0.5 | 1.0 | 1.5 | 2.0 |
| PROPERTIES of composite | | | | |
| Flexural strength ($10^3$ psi) | 52.0 | 51.4 | 58.5 | 46.1 |
| Flexural Modulus ($10^6$ psi) | 1.86 | 1.88 | 2.17 | 1.89 |
| Heat deflection temperature (°C.) | 232 | 221 | 228 | 211 |
| Weight gain after 16 hours in acetone (%) | 6.8 | 2.5 | 4.4 | 7.0 |
| Glass Content (wt. %) | 59 | 60 | 58 | 59 |

EXAMPLES 22 TO 25

These Examples show the effect of the hydroxyl groups to maleic anhydride stoichiometry on the properties of fiber reinforced composites made using a triol. A series of composites with approximate dimensions of 10×10×⅛ inches were prepared from a resin composition containing a triol, the polycaprolactone ester of trimethylol propane containing 1.5 moles of caprolactone. In the resin formulations, the molar ratio of hydroxyl groups to maleic anhydride was the following: 0.5, 1.0, 1.5, and 2.0. The maleic anhydride to styrene stoichiometry in the formulation was 1.00:1.45. The pressure bag mold described above was used. The resin was poured onto a bed of PPG type AKM glass mat. Composites were molded for 8 minutes at 135° C. using a nitrogen pressure of 250 psi. The resin formulations are listed in Table V.

The composites were tested to determine flexural strength and flexural modulus and heat deflection temperature by the procedures as described in Examples 18 to 21.

The results are shown in Table V.

The data in Table V shows that composites made with resins possessing hydroxyl group to maleic anhydride stoichiometries between about 0.5 and about 2.0 have high stiffness and strength as well as high heat deflection temperatures. The preferred stoichiometry of hydroxyl groups to maleic anhydride is between about 0.5 to about 1.5.

TABLE V

|  | EXAMPLE | | | |
| --- | --- | --- | --- | --- |
|  | 22 | 23 | 24 | 25 |
| RESIN FORMULATIONS | | | | |
| OH/maleic anhydride stoichiometry | 0.5 | 1.0 | 1.5 | 2.0 |
| Polycaprolactone ester (g) | 19.8 | 39.7 | 59.6 | 79.4 |
| Maleic anhydride (g) | 38.9 | 38.9 | 38.9 | 38.9 |
| Styrene (g) | 60.0 | 60.0 | 60.0 | 60.0 |
| Zelec UN (g) | 0.7 | 0.7 | 0.7 | 0.7 |
| t-butyl hydroquinone (g) | 0.06 | 0.06 | 0.06 | 0.06 |
| t-butyl perbenzoate (g) | 1.2 | 1.4 | 1.6 | 1.8 |
| PROPERTIES OF THE COMPOSITE | | | | |
| Flexural strength | 54.4 | 56.3 | 60.8 | 46.8 |
| Flexural modulus | 1.96 | 1.98 | 2.23 | 1.72 |
| Glass content (wt. %) | 60 | 59 | 59 | 57 |
| Heat deflection temperature (°C.) | >258 | >260 | >260 | >250 |

EXAMPLE 26

This Example shows the effect of a basic compound (1-methylimidazole) in the resin formulation on the solvent resistance of composites molded therefrom. The effects of the basic compound were investigated by soaking $1 \times 4 \times \frac{1}{8}$ inch test specimens of selected composites in acetone for 16 hours and determining weight gains.

The results are shown in Table VI.

TABLE VI

| Composite of Example | Polyol | Molding Conditions | Basic Compound | Weight gain after 16 hr. in acetone (%) |
| --- | --- | --- | --- | --- |
| 10 | polycaprolactone ester | 6 minutes at 135° C. | No | 23.3 |
| 11 | | | Yes | 5.2 |
| 14 | 1,4-cyclohexanedimethanol + polycaprolactone ester | 5 minutes at 135° C. | No | 4.3 |
| 15 | | | Yes | 2.7 |

The data in Table VI shows that the addition of a basic compound to the resin formulation reduces acetone uptake, and therefore improves solvent resistance.

EXAMPLE 27

This Example shows the effect of boiling water on composites.

Test specimens cut from the composites of Examples 10 to 13 with dimensions of $1 \times 4 \times \frac{1}{8}$ inches were immersed in boiling water for 2 hours.

The weight gains of these specimens was then determined. The effect of a basic compound (1-methylimidazole) in the formulation on weight gains was also determined.

The results are shown in Table VII.

TABLE VII

| Composite of Example | Polyol | Molding Conditions | Basic Compound | Weight gain after 2 hr. water boil (%) |
| --- | --- | --- | --- | --- |
| 10 | polycaprolactone ester | 6 minutes at 135° C. | No | 1.7 |
| 11 | | | Yes | 0.9 |
| 12 | 1,4-cyclohexanedimethanol | 7 minutes at 135° C. | No | 1.0 |
| 13 | | 6 minutes at 135° C. | Yes | 0.6 |

The weight gains of test samples of the composites of Examples 10 and 12 are low, indicating little damage to the composite. The addition of a basic compound to the resin formulations of Examples 10 and 12 affords the formulations for Examples 11 and 13, respectively. The data in Table VII show that the addition of a basic compound to the resin formulation results in lower weight gains in the composites.

What is claimed is:

1. A process for producing a fiber reinforced rigid article containing 15 to about 80 weight percent of fibers which process comprises adding a curable physical mixture comprising an active hydrogen containing compound selected from a polyol, a polyamine, an amino alcohol, or mixtures thereof, (b) an unsaturated carboxylic anhydride, and (c) an ethylenically unsaturated monomer into a mold cavity containing said fiber and curing the components therein.

2. A process as in claim 1, wherein the active hydrogen containing compound is a polyol.

* * * * *